United States Patent [19]
Zerachia et al.

[11] 3,798,004
[45] Mar. 19, 1974

[54] TEST DEVICE

[75] Inventors: Avraham Zerachia; Natan Friedgut; Gary Steinman, all of Jerusalem, Israel

[73] Assignee: Ames-Yissum, Ltd., Givat Shaul, Jerusalem, Israel

[22] Filed: Apr. 18, 1972

[21] Appl. No.: 245,242

[52] U.S. Cl. ................. 23/253 TP, 116/114 AM
[51] Int. Cl. ................. G01n 21/06, G01n 21/20
[58] Field of Search ........ 23/230, 253 TP, 292, 259; 116/114 AM

[56] References Cited
UNITED STATES PATENTS

| | | | |
|---|---|---|---|
| 2,606,102 | 8/1952 | Cook | 23/253 TP |
| 3,036,894 | 5/1962 | Forestiere | 23/253 TP |
| 3,232,710 | 1/1966 | Rieckmann et al. | 23/253 TP |
| 3,420,205 | 1/1969 | Morison | 23/253 TP |
| 3,620,676 | 11/1971 | Davis | 23/253 TP |

*Primary Examiner*—Morris O. Wolk
*Assistant Examiner*—R. E. Serwin

[57] ABSTRACT

An improved dip and read type test device having a flat bibulous matrix having an indicator incorporated therewith, the matrix being disposed between and attached to a pair of liquid impervious members and having exposed peripheral edge portions such that upon immersion into a solution containing material to which said indicator is responsive, flow of said solution into said matrix through said edge portions causes formation of measurable visible indicia pattern on the matrix.

7 Claims, 10 Drawing Figures

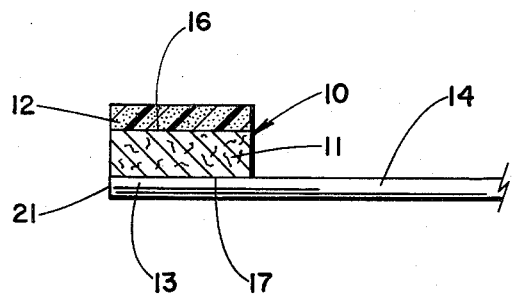
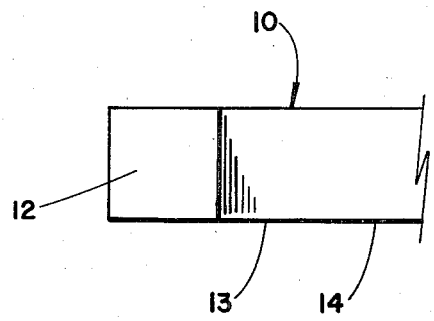
FIG. 1                    FIG. 2
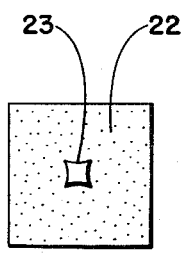 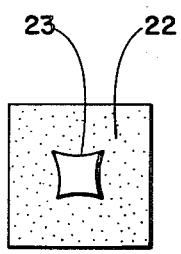 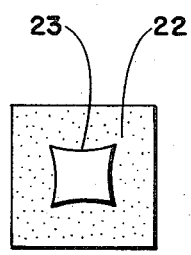 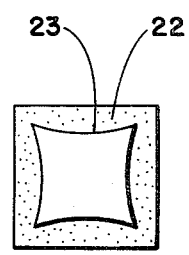
FIG. 3    FIG. 4    FIG. 5    FIG. 6
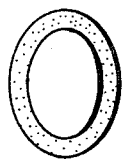 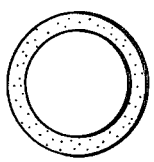 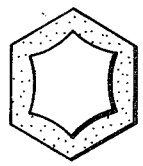 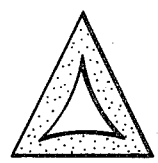
FIG. 7    FIG. 8    FIG. 9    FIG. 10

TEST DEVICE

BACKGROUND OF THE INVENTION

Dip and read type test devices are commonly used to analyze solutions for suspected materials. This type of device generally includes a bibulous material impregnated with a test system including an indicator responsive to the presence of the suspected material in the solution tested. The bibulous material, upon dipping into the test solution, absorbs a sample thereof, and a color is developed if the suspected material is present in the solution. The area of the developed color is indicative of the concentration of suspected material in the solution.

The entire dipped area of the bibulous material of the prior art devices changes color in the presence of the suspected material, such that interpretation of the test results may vary dependent upon a number of external conditions, such as lighting or the eyesight of the operator. Likewise, some operators may have problems interpolating concentrations when the intensity of the developed color is borderline between known colors for two different concentrations.

Therefore, a dip and read device capable of forming a measurable indicia would enable one to overcome the foregoing problems, yet provide the convenience generally found in dip and read devices.

SUMMARY OF THE INVENTION

An improved dip-and-read type test device is provided for determining the presence and concentration of a suspected material in a solution, the device including a flat bibulous matrix member having a test system including an indicator for said suspected material incorporated therewith, said matrix member being laminated between a pair of liquid impervious members and having exposed peripheral edge portions such that upon immersion into the solution, the matrix absorbs the solution from said edge portions, whereby the suspected material, if present in the solution, will cause the indicator in the test system to provide a visible color pattern on the matrix as said solution progresses inwardly toward the center of the matrix. The depth of inward penetration of the color pattern is measurable to indicate the concentration of the material in the tested solution.

BRIEF DESCRIPTION OF THE DRAWING

FIG. 1 is a fragmentary side elevational view of one form of device of this invention;

FIG. 2 is a fragmentary plan view of the device of FIG. 1; and

FIGS. 3, 4, 5 and 6 are plan views showing configurations of color patterns produced by different concentrations of suspected material in solutions absorbed into the device of FIGS. 1 and 2;

FIG. 7 is exemplary of a color pattern formed on an embodiment of the present invention which is oval in plan view;

FIG. 8 is exemplary of a color pattern formed on an embodiment of the present invention which is round in plan view;

FIG. 9 is exemplary of a color pattern formed on an embodiment of the present invention which is hexagonal in plan view; and FIG. 10 is exemplary of a color pattern formed on an embodiment of the present invention which is triangular in plan view.

DESCRIPTION OF THE PREFERRED EMBODIMENTS

Referring now to the drawing, and particularly to FIGS. 1 and 2, the illustrated test device is indicated by the numeral 10. The test device 10 generally includes an absorbent matrix 11 disposed between and attached to first and second liquid impermeable members 12 and 13 respectively. For convenience, member 13 may be elongated to form a handle 14 for the device.

The matrix 11 is a flat bibulous material such as filter paper, or the like and has exposed peripheral edge portions. The matrix 11 may be of any suitable configuration. It is shown as being rectangular in FIGS. 1 and 2; however, as shown in FIGS. 7 to 10, it can take oval, circular, hexagonal or triangular shapes, respectively.

A test reagent system, of the type commonly used in known dip-and-read devices, is preferably incorporated, as by impregnation, into the matrix 11 and subsequently dried. Examples of suitable systems are described in U.S. Pat. Nos. 2,986,453 and 3,063,913. The test system generally includes an indicator which will change color when contacted by the material to be detected in liquid tested by use of the device.

At least one of the members 12 and 13, preferably the member 12, is made of transparent material. Materials found suitable for this purpose are polyethylene teraphthalate and polystyrene.

The member 12 is attached, as by heat sealing, to the entire flat upper surface 16 of the matrix 11 and is shaped or cut to be congruent with the configuration of the matrix 11 as shown in FIGS. 1 and 2.

The second member 13 may be selected from the same group of materials as member 12 and is attached, as by bonding, to the flat lower surface 17 of the matrix 11. The portion of the member 13 attached to the matrix 11, except for the handle portion 14 thereof, is shaped to be congruent with the configuration of the matrix 11 as also shown in FIGS. 1 and 2.

The device 10 is adapted to be immersed into the solution to be tested in order that a sample thereof, together with any suspected materials for which the solution is being tested, may be absorbed into the matrix 11 for reaction with the test system therein. In view of the attachment of the liquid impervious members 12 and 13 to the matrix 11, absorption of the solution by the matrix 11 is by way of the exposed edge 16 portions of the matrix only. Since the amount of suspected material absorbed by the matrix 11 is necessarily limited by the capacity of the matrix 11 and the concentration of the suspected material in the solution, a semi-quantitative determination is possible.

Thus, the suspected material in the solution absorbed by the matrix 11 reacts with the test system incorporated with the matrix 11 beginning at the exposed edge portions thereof, causing a color change in the areas, such as the border area 22 shown in FIG. 6, in which such reaction takes place. As any unreacted material progresses further into the matrix 11 with the absorbed solution, area in which the color change takes place extends further inwardly, as shown in FIGS. 5, 4, and 3. Upon the matrix 11 becoming saturated, no further inflow of solution or suspected material takes place and no further change in the area of color change occurs, and the color pattern developed can be observed through the member 12.

The width of the color pattern developed is indicative of the concentration of the suspected material in the solution tested. The relatively narrow pattern 22 developed in FIG. 6 is indicative of a low concentration of suspected material in the solution tested, whereas the patterns 22 in FIGS. 5, 4 and 3 are relatively wider and indicate correspondingly higher concentrations of the suspected material in the test solution.

To expedite reading the test results, a chart may be used which is calibrated to relate the width or size of the unreacted area 23 of the matrix to known concentrations of the suspected material. A simple comparison of the unreacted area 23 with such chart indicates the concentration of suspected material present in the test solution.

Alternatively, the thickness of the reacted area 22 may be used as the measure of the concentration of the suspected material present in the solution tested.

What is claimed is:

1. A test device for determining the presence and concentration of a suspected material in a solution comprising a flat bibulous matrix having two oppositely disposed surfaces, each of said surfaces having attached thereto an unconnected layer of liquid impermeable material, one of said layers being substantially transparent, said matrix incorporated with a reagent test system capable of undergoing a color change in response to the suspected material and exposed to the solution upon immersion therein along the entire peripheral edge of said matrix whereby flow of the solution containing the suspected material into said matrix from said peripheral edge causes formation on said matrix a color pattern visible through said transparent layer.

2. A test device as defined in claim 1 wherein said one layer has a shape congruent with the shape of said matrix.

3. A test device as defined in claim 1 wherein said one layer is bonded to said matrix over the entire upper surface area of said matrix.

4. A test device as defined in claim 3 wherein said one member is bonded to said matrix by heat sealing.

5. A test device as defined in claim 1 wherein the other of said layers is bonded to said matrix by heat sealing.

6. A test device as defined in claim 1 wherein the other of said layers is formed with a handle portion.

7. A test device as defined in claim 1 wherein said test system is present in a quantity relative to the normal concentration of suspected material expected in the solution.

* * * * *